United States Patent [19]

Daffara et al.

[11] Patent Number: 5,371,761
[45] Date of Patent: Dec. 6, 1994

[54] TRANSMISSION SYSTEM AND RECEIVER FOR THIS SYSTEM

[75] Inventors: Flavio Daffara; Antoine Chouly, both of Paris, France

[73] Assignee: U.S. Philips Corporation, New York, N.Y.

[21] Appl. No.: 87,037

[22] Filed: Jul. 1, 1993

[30] Foreign Application Priority Data

Jul. 16, 1992 [FR] France .................. 92 08792

[51] Int. Cl.⁵ .............................................. H04L 9/00
[52] U.S. Cl. ................................................ 375/1
[58] Field of Search ............... 380/48, 49; 375/1, 114, 375/115, 116; 370/100.1, 105.1, 105.2

[56] References Cited

U.S. PATENT DOCUMENTS 4,797,923 1/1989 Clarke ............................ 381/31
5,101,416 3/1992 Fenton et al. ................... 375/1

OTHER PUBLICATIONS

B. Le Floch et al., "Digital Sound Broadcasting To Mobile Receivers", IEEE Transactions on Consumer Electronics, vol. 35, No. 3, Aug. 1989, pp. 493–503.

*Primary Examiner*—David C. Cain
*Attorney, Agent, or Firm*—Michael E. Marion

[57] ABSTRACT

Receiver (105) for signals transmitted according to an orthogonal frequency division multiplexing technique with carriers distributed symmetrically around a centre frequency $f_e$, said receiver comprising a frequency synchronizer (116) for the local oscillator (214). The synchronizer (116) utilizes the fact that part of the side carriers are not transmitted to ensure in the lock-on mode a frequency synchronization having a wide lock-on range. It may also be used in the permanent mode with very little jitter. The receiver can be used in digital television for receiving signals transmitted according to an orthogonal frequency division multiplexing technique.

14 Claims, 4 Drawing Sheets

TRANSMISSION SYSTEM AND RECEIVER FOR THIS SYSTEM

BACKGROUND OF THE INVENTION

The invention relates to a transmission system comprising a transmitter for transmitting signals in N carriers distributed symmetrically around a centre frequency $f_e$, which signals have a spectrum comprised of a central part formed by N' transmitted carriers (N'<N) and a right-hand side part and a left-hand side part formed each by (N-N')/2 non-transmitted carders, this transmitter being connected to a receiver which comprises at least a frequency synchronizer which determines a synchronization correction signal, and a local oscillator controlled by said correction signal.

The invention likewise relates to a receiver for such a system.

Such a system has applications to the transmission of signals which have a symmetrical spectrum, such as different digital and analog signals. An example of such a signal is a signal transmitted according to an Orthogonal Frequency-Division Multiplexing technique, transmitted, more specifically, by way of Hertzian waves, by cable, by satellite, for example for applications to digital television.

The signals transmitted according to an N-frequency-division multiplexing technique will in the following be denoted by the simplified name of OFDM (Orthogonal Frequency-Division Multiplex) signals. The OFDM technique consists of dividing an information signal to be transmitted into fractions by distributing it over a large number of low-rate elementary channels. Thus, a highly selective wideband channel is transformed into a large number of non-selective elementary channels. Because they all form a wideband channel, it will be hardly likely that fading during transmission will simultaneously affect the whole channel. This technique makes it also possible to reduce intersymbol interference.

Each elementary channel thus corresponds to one frequency, all the frequencies being symmetrically distributed around a central carrier frequency. As it is hard to accept the use of selective filters at the receiving end, an overlapping of the spectra is preferably tolerated, but conditions as to orthogonality between the frequencies are then imposed to eliminate the intersymbol interference at the sampling instants. The whole spectrum of an OFDM signal thus tends towards a rectangular spectrum.

To avoid problems with spectrum overlapping at the receiving end due to the sampling of the received signal, the side carriers situated on the left and right of the frequency spectrum are not transmitted. In addition, the filtering at the receiving end can be performed with less steep edges.

At the receiving end the received signals are to be demodulated and then decoded to restore the original information signals. For this demodulation a local oscillator is used whose frequency is to be controlled by the transmitting frequency by means of a synchronization correction signal.

Such a system is known from the article entitled "Digital Sound Broadcasting to Mobile Receivers", by B. Le Floch et at, IEEE Transactions on Consumer Electronics, Volume 35, No. 3, August 1989. This article describes an automatic frequency control (AFC). This arrangement operates in that it detects the phase difference between the received signal and the estimated symbol of the constellation. It may thus detect a maximum frequency offset of $\pm\frac{1}{8}T$ between the local oscillator of the transmitter and the local oscillator of the receiver where T is the symbol duration. It may be deduced therefrom, that, for example, for a symbol duration T=160 $\mu$s and a carrier frequency $f_e$=500 MHz, the lock-on range is 781.25 Hz which requires a high-precision ($\Delta f/f_e$)=1.56 p.p.m. and very stable local oscillator (for the receiver).

The disadvantage of such an arrangement is thus the necessity to have a high-precision, thus very costly, local oscillator, because the maximum acquisition range is $\pm\frac{1}{8}T$. Thus, with such synchronizers, the acquisition range is very narrow and the receiver cannot be automatically locked-on to when there is considerable loss of synchronization.

The main object of the invention is thus to increase the acquisition range of the synchronizer. This is to be realised with a local oscillator which is not very precise and is thus less costly, for example, for mass production applications to digital television.

SUMMARY OF INVENTION

This object is achieved with a receiver of the type described in the opening paragraph, for which the frequency synchronizer determines the correction signal by measuring a difference of the power received in at least a pair of non-transmitted carriers, a pair being formed by a non-transmitted right-hand side carrier and a non-transmitted left-hand side carrier symmetrical with the previous carrier with respect to the centre frequency $f_e$.

Thus, compared with the cited document, the acquisition range for the synchronisation is enhanced by a factor of at least 100 in the case where, for example, N-N'$\geq$26 (13 non-transmitted carriers on either one of the two sides). This considerably reduces the costs of the oscillator.

When operating in the lock-on mode, the frequency synchronizer influences various pairs of non-transmitted side carriers. When it operates permanently, the synchronizer influences a pair of non-transmitted side carriers which are nearest to the centre frequency $f_e$. A control signal may switch the receiver to one or the other mode.

These different aspects of the invention and further aspects will be explained and become apparent from embodiments to be described hereinafter.

BRIEF DESCRIPTION OF THE DRAWINGS

The invention will be better understood with the aid of the following drawing Figures, given by way of non-limiting examples, which represent.

DETAILED DESCRIPTION OF THE PREFERRED EMBODIMENT

Figure 1:
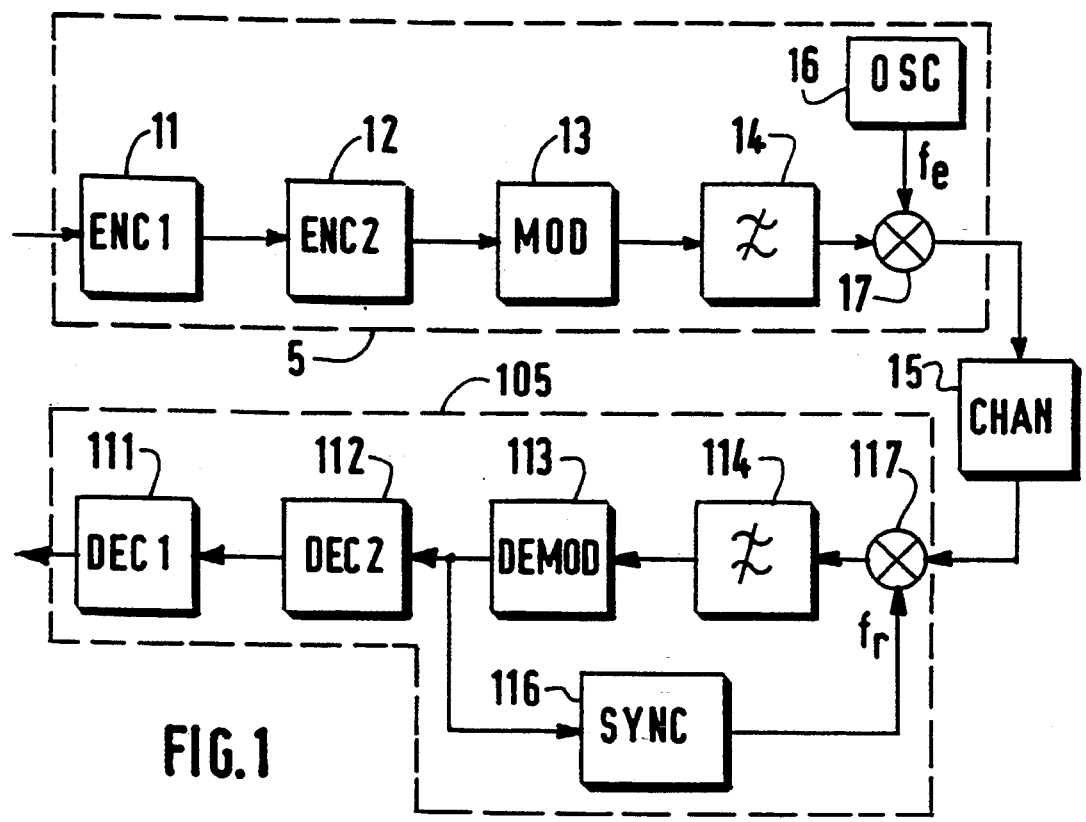
FIG. 1: a block diagram of a digital signal transceiver system.

FIG. 1 shows a block diagram of a digital transmission system formed by a transmitter 5 and a receiver 105 which communicate over a channel CHAN 15. Hertzian links, satellite links or cable links may be concerned here. The transmitter 5 comprises in a series combination:

- a source encoder ENC1 11 (which may be omitted)
- a channel encoder ENC2 12,
- an OFDM modulator MOD 13,
- a transmission filter 14,
- an oscillator OSC 16 which generates a carrier $f_e$,
- a mixer 17 for the carrier $f_e$.

For an application to digital television signal transmission with a better quality than that obtained with the PAL standard, the source encoder 11 supplies a bit rate of the order of 8 Mbits/s. The samples are encoded by the channel encoder 12 to make them invulnerable to channel imperfections. The modulator 13 thereafter adapts the digital samples to the transmission channel, for example, a ground-based transmission channel (example: broadcasting in an 8 MHz band).

At the receiving end the receiver 105 performs reverse operations to those performed at the transmitting end. Therefore, it comprises (at the output of channel 15):

- a mixer 117 which multiplies the received signal by a local regenerated carrier $f_r$,
- a receiving filter 114,
- an OFDM demodulator DEMOD 113,
- a channel decoder DEC2 112,
- a source decoder DEC1 111 (which may be omitted)
- a carrier synchronizer SYNC 116 which generates the regenerated carrier $f_r$.

For clarity of the description the known mechanisms used at the transmitting end will be given first.

Figure 2:
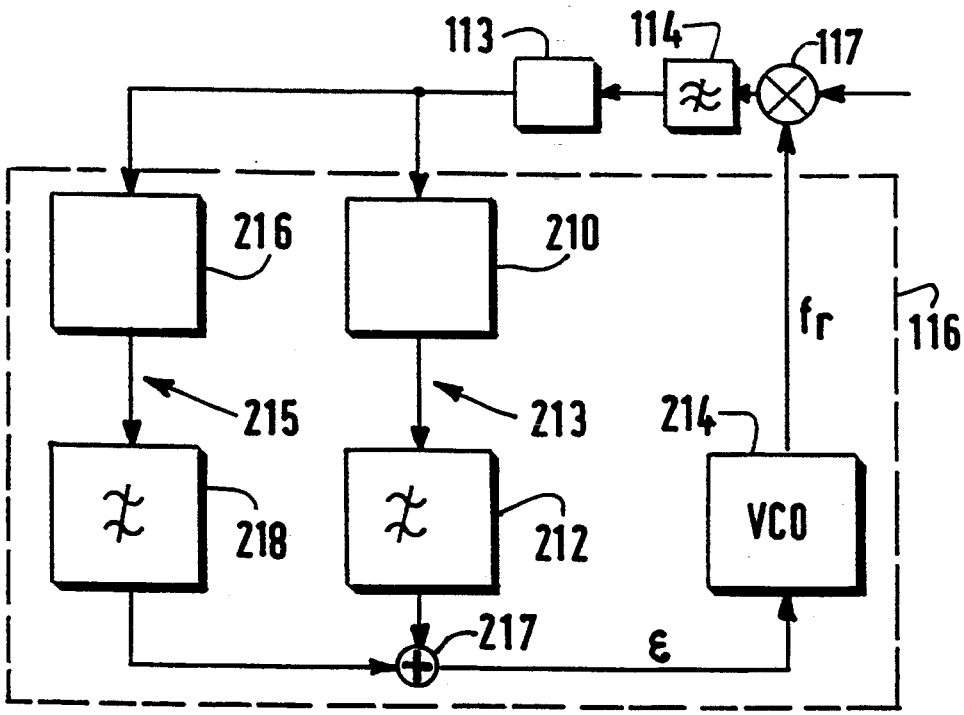
FIG. 2: a diagram of a prior art synchronizer.

FIG. 2 represents a diagram of a prior art synchronizer 116. To the output of the demodulator 113 is connected a frequency detector 210 followed by a filter 212 which produces a correction signal $\epsilon$ which is applied to a voltage controlled local oscillator 214 which produces the local regenerated carrier $f_r$ which is fed to the mixer 117. Thus any frequency difference between the local oscillator 214 and the frequency of the oscillator 16 of the transmitter causes a correction signal $\epsilon$ to be produced, which signal is larger or smaller depending on the value of this difference. Such a frequency control loop is conventional in digital data transmission. Depending on the modulations used, it may be necessary to add a phase synchronization to the frequency synchronization. In that case one has in parallel with the branch 213 for the frequency synchronization, a phase detector 216 followed by a filter 218. The correction signals coming from the frequency synchronization branch 213 and phase synchronization branch 215 are added together in an element 217 and fed to the local oscillator 214.

Figure 3:
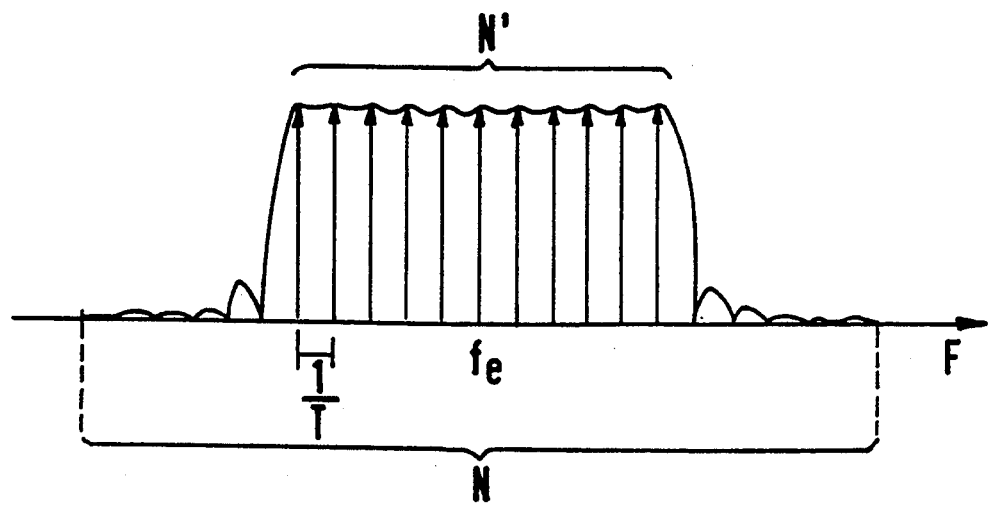
FIG. 3: the frequency spectrum of an OFDM signal.

FIG. 3 represents a transmission frequency spectrum of an OFDM signal formed by N equidistant carriers having a frequency difference 1/T, where T is the symbol frequency. This channel is centred around a centre frequency $f_e$. For reasons of spectrum overlap already discussed, not all the frequencies constituting the channel are transmitted. Only the N' central carriers are transmitted, whereas the (N-N') non-transmitted carriers are symmetrically distributed over either one of the two sides of the transmitted central carriers. For simplification of parlance, they are designated as right-hand and left-hand side carriers.

Figure 4:
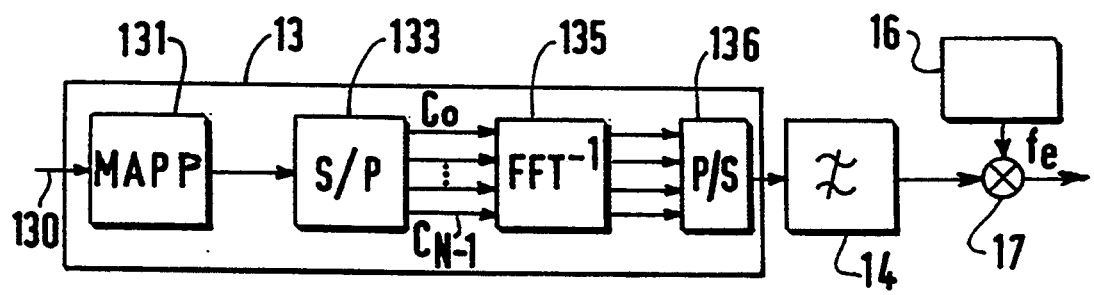
FIG. 4: a diagram of an OFDM signal modulator.

At the transmitting end the transmitted carriers are modulated by the digital signals to be transmitted according to prior art principles. FIG. 4 shows the diagram of the modulator 13 which applies data to the filter 14 and then to the mixer 17 connected to the oscillator 16. The digitized input data present on the input 130 are fed to a binary allocation unit MAPP 131 which distributes the input data as code symbols of a constellation. The coded symbols which appear in series at the output of the unit 131 are subjected to a serial/parallel conversion S/P 133 to form N complex symbols $C_k$ ($0 \leq k < N-1$). A complex symbol $C_k$ is used to modulate a frequency carrier $f_k$ with $f_k = k/T$ (due to the orthogonality), where T is the duration of an OFDM symbol and k the index of the carrier. The combination of all the carriers $f_k$, modulated for generating the whole OFDM signal, narrows down to performing an inverse Fourier Transform in an arrangement 135. In the special case where N is a power of 2, the inverse Fourier Transform can be performed by using the inverse Fast Fourier Transform (FFT$^{-1}$) as indicated in FIG. 4. This makes a reduction possible of the complexity of the circuit. The N signals coming from the arrangement 135 undergo a parallel/serial conversion 136. After filtering in 14, the signal coming from the filter 14 is mixed with the carrier frequency $f_e$ of the oscillator 16. These modulation techniques are well-known to those skilled in the art.

The invention is, in essence, related to the carrier synchronization at the receiving end, so that the receiver operates with equal frequency to that used by the transmitter. Owing to the symmetry of the OFDM spectrum, a frequency difference can be detected by comparison of the received power in the left-hand part of the non-transmitted carriers and the received power in the right-hand part of the non-transmitted carriers. The error signal is then given by:

$$\epsilon^f = \sum_{k=(N+N')/2}^{N-1} |q_k|^2 - \sum_{k=0}^{\frac{(N-N')}{2}-1} |q_k|^2$$

Figure 5:
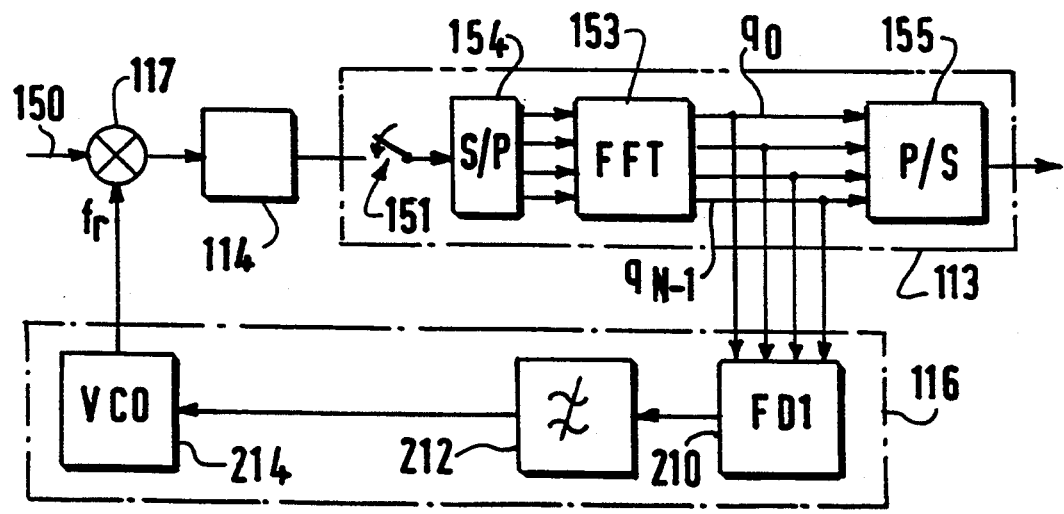
FIG. 5: a diagram of part of a receiver comprising a synchronizer according to the invention.

FIG. 5 represents a demodulator 113 which performs at the receiving end the reverse operations to those performed at the transmitting end. For that purpose, it comprises a sampler 151 which operates with a timing N/T, where N is the total number of carriers of the OFDM channel and 1/T is the symbol frequency. The samples thus obtained are subjected to a serial/parallel conversion 154, are then fed to an arrangement 153 which performs a discrete Fourier Transform (preferably a Fast Fourier Transform FFT) to produce in parallel $q_k$ samples ($0 \leq k \leq N-1$), which samples are subjected to a parallel/serial conversion in an arrangement 155. The samples received on the input 150 arrive at a mixer 117 and are mixed with a regenerated carrier $f_r$ coming from the frequency synchronizer 116 as has been indicated in FIG. 1. According to the invention, the frequency synchronizer 116 takes off all the samples $q_k$ from the output of the arrangement 153 (FFT) and determines the power present in the non-transmitted side carriers. The frequency synchronizer 116 comprises a frequency detector 210 which receives the samples $q_k$ of the non-transmitted side carriers, the low-pass filter 212 and the oscillator VCO 214. The frequency synchronizer 116 is to be capable of reducing the frequency difference $\Delta f$ between the carrier frequency $f_e$ at the transmitting end and the regenerated frequency $f_r$ at the receiving end ($\Delta f = f_e - f_r$) to zero. If a non-zero frequency error $\Delta f$ occurs, the received spectral power density is not symmetrical around the centre frequency $f_e$. This asymmetry is thus utilized for generating an error signal that is proportional to $\Delta f$.

The acquisition range of the synchronizer is approximately equal to $$|\Delta f.T|_{max} = (N - N')/2$$

Taking account of the conventional given values of N and N' (N=1024, N'=800), this leads to an acquisition range $\Delta f.T$ of about $\pm 100$. Consequently, an oscillator can be used at the receiving end which has a relative accuracy as high as that of the oscillator of the synchronizer of cited document. In effect, for example, for a symbol duration T=160 $\mu$s and a carrier frequency $f_e$=500 MHz, a relative accuracy is obtained of $\Delta f/f_e$=1250 p.p.m., which value is about 1000 times higher than what can be deduced from cited document. A curve of mean values $E[\epsilon^f]$ is plotted against the parameter $\Delta f.T$ in FIG. 6-A. It is noted that this curve is undulated and has a substantially linear progression. When the frequency differences are considerable ($\Delta f$, T large, lock-on mode), the synchronizer reduces them to near-zero values. When the frequency differences are near zero ($\Delta f.T$ small, permanent mode), the linearity of the curve is not satisfactory. It is noted that the curve of FIG. 6-A presents a zero slope at $\Delta f.T \cong 0$. Around the zero point, this curve may be approximated by a third-order polynomial. The sensibility of the synchronizer may thus become insufficient which implies an accentuation of jitter phenomena.

Figure 6:
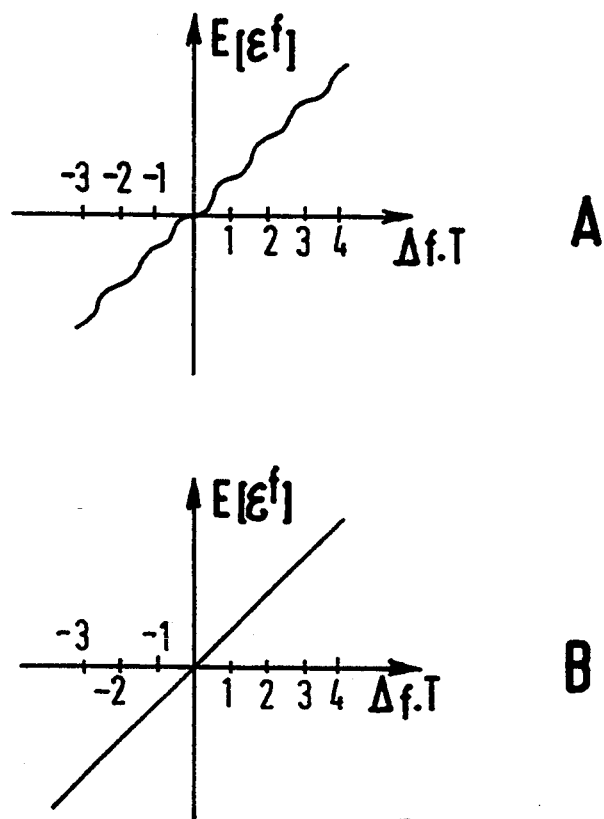
FIG. 6: two curves showing the variations of the correction signal before (A) and after (B) linearization.
Figure 7:
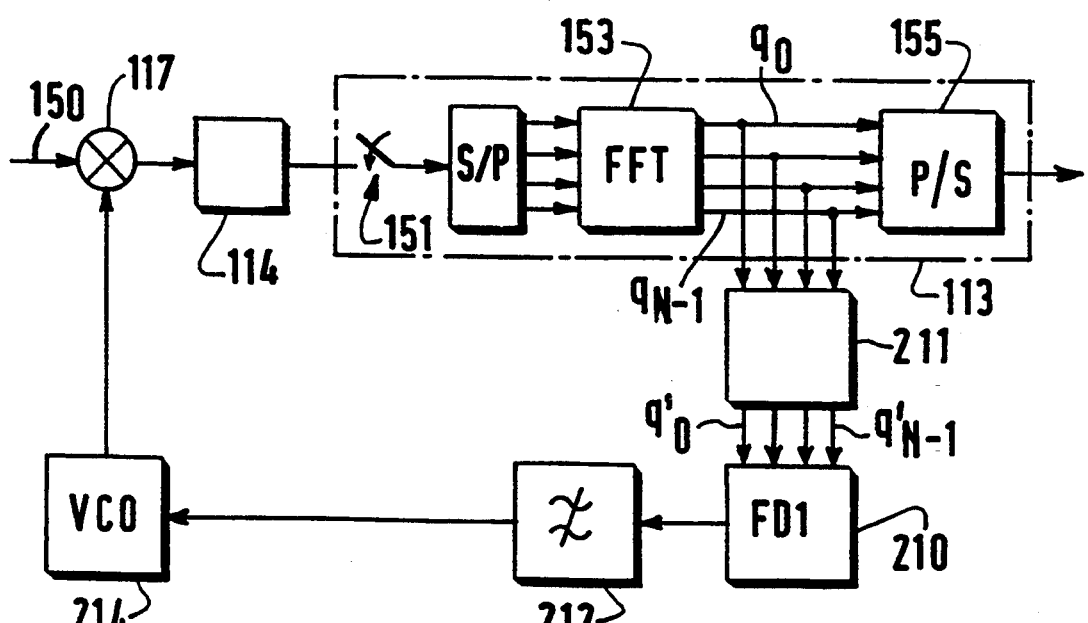
FIG. 7: an analogous diagram to that of FIG. 5 completed by a linearity filter.

To increase the performance of the synchronizer in the permanent mode, that is to say, near to the origin of the curve of FIG. 6-A, a linearity filter 211 is added to the frequency detector 210 (FIG. 7). This linearity filter transforms each sample $q_k$ into a sample $q'_k$, so that:

$$q'_k = q_k - \frac{1}{2} q_{k-1} - \frac{1}{2} q_{k+1}$$

Thus, with each sample $q_k$, half of each of the two side samples $q_{k-1}$ and $q_{k+1}$ is subtracted.

The frequency detector thus calculates the error signal according to:

$$\epsilon^f = \sum_{k=(N+N')/2}^{N-1} |q'_k|^2 - \sum_{k=0}^{\frac{N-N'}{2}-1} |q'_k|^2$$

Nevertheless, when the frequency synchronizer operates in the permanent mode, a jitter phenomenon may continue to occur which leads to slight frequency fluctuations around $\Delta f \cong 0$. In a particular embodiment the correction signal is no longer calculated with the received power of all the non-transmitted left/right-hand side carriers, but only of the first non-transmitted left-hand side carrier and the first non-transmitted right-hand side carrier which are closest to the centre frequency.

A correction signal $\epsilon_2^f$ is obtained which can be written as $$\epsilon_2^f = |q'_{\frac{N+N'}{2}}|^2 - |q'_{\frac{N-N'}{2}-1}|^2$$

This correction signal $\epsilon_2^f$ is used when the frequency synchronizer is in the permanent mode. In effect, in the permanent mode, that is to say, when the frequency difference becomes very small (for example $\Delta f.T < 0.02$), the use of 2 carriers suffices for reducing this difference to zero and, moreover, permits the reduction of jitter i.e. the jitter caused by the synchronizer which uses all the non-transmitted carriers. In the lock-on mode (for example, $\Delta f.T$ is very large), it is necessary to use a large enough number of side carriers (with a maximum of N-N') to increase the acquisition range. In practice the number of side carriers used in the lock-on mode is determined as a function of the desired maximum acquisition range.

It is possible to insert a first frequency detector FD1 which uses all the non-transmitted side carriers and which operates in the lock-on mode. This first frequency detector FD1 is extended by a second frequency detector FD2 which uses only the first non-transmitted left-hand side carrier and the first non-transmitted right-hand side carrier and which operates in the permanent mode. They may have common hardware means.

The invention likewise relates to a receiver which is synchronized when switching automatically from the permanent to the lock-on mode and, reversely, as a function of the receiving conditions.

Figure 8:
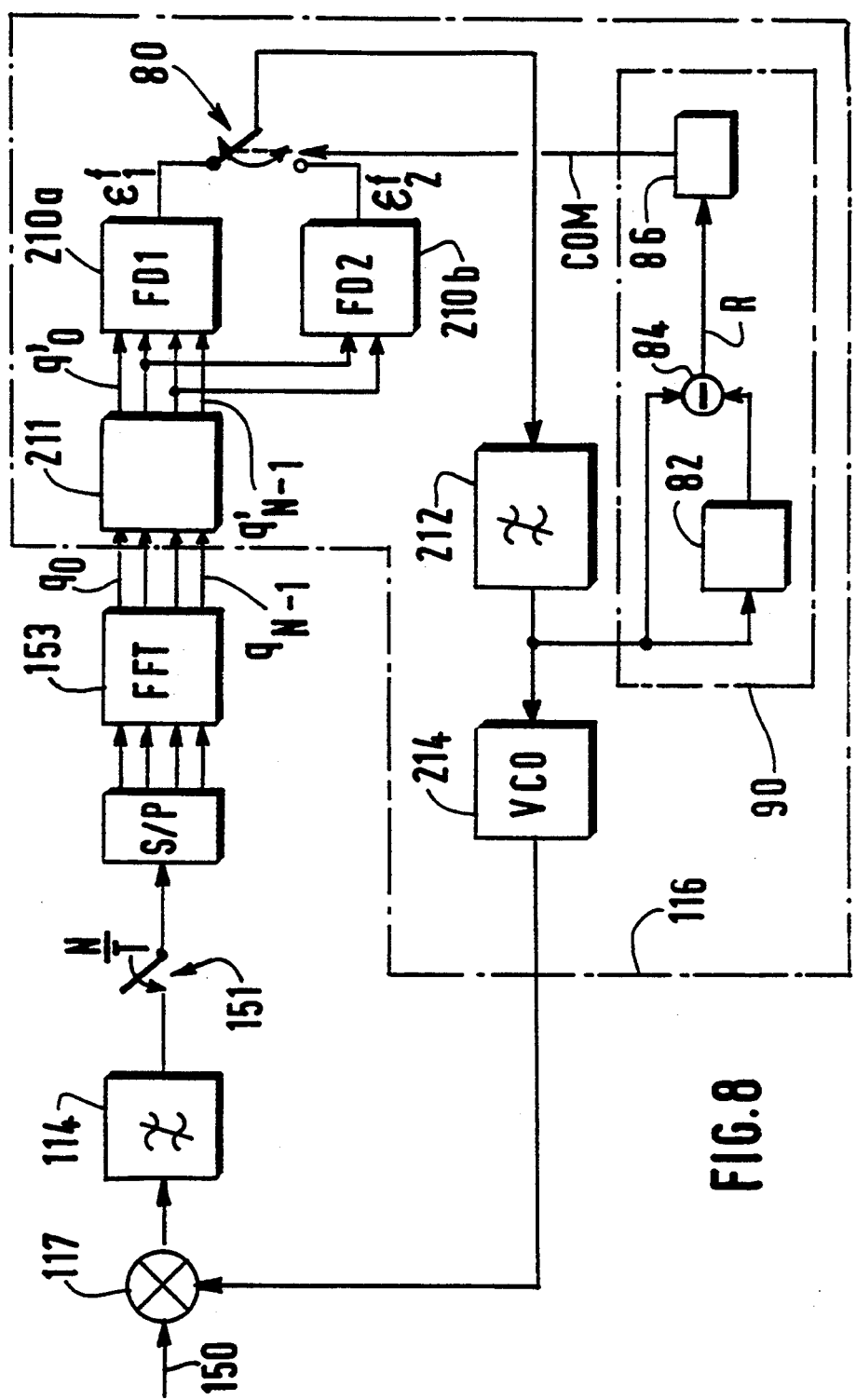
FIG. 8: a diagram of a synchronizer according to the invention operating either in the acquisition mode or in the permanent mode.

FIG. 8 represents a synchronizer 116 which comprises a detector FD1 210a and a detector FD2 210b, which can be put into operation by a switch 80 to activate the oscillator VCO 214 across the loop filter 212. The other elements are represented by the same references as used previously.

For determining whether the synchronizer is to be put in the lock-on mode or the permanent mode, a mode detection circuit 90 is used. To this end, part of the error signal at the output of the loop filter 212 is taken off. This signal is delayed in a delay element 82. The delayed signal is subtracted from the undelayed signal in a block 84 which produces the result R. The absolute value of the result R is compared with a threshold Th in a comparator 86 which produces a switch signal COM. The latter signal activates:

either the lock-on mode if R>Th, or the permanent mode if R≦Th.

We claim:

1. A transmission system comprising a transmitter for transmitting signals on a first number N of carriers distributed symmetrically around a centre frequency $f_e$, which signals have a spectrum comprised of a central part formed by a second number N' of transmitted carriers, where N' is smaller than N and a right-hand side part and a left-hand side part formed each by a third number of non-transmitted carriers, where said third number equals (N-N')/2, said transmitter being connected to a receiver which comprises a frequency synchronizer which determines a synchronization correction signal, and a local oscillator controlled by said correction signal, wherein the frequency synchronizer determines the correction signal by measuring a difference of the power received in a pair of non-transmitted carriers, said pair being formed by a non-transmitted right-hand side carrier and a non-transmitted left-hand side carrier symmetrical with said non-transmitted right-hand side carrier with respect to the centre frequency $f_e$.

2. The transmission system as claimed in claim 1, wherein for operating in the lock-on mode, the receiver comprises a first frequency detector which operates with various pairs of non-transmitted side carriers.

3. The transmission system as claimed in claim 1, wherein for operating in the permanent mode, the receiver comprises a second frequency detector which operates with a pair of non-transmitted side carriers which are nearest to the centre frequency $f_e$.

4. The transmission system as claimed in claim 2, wherein it comprises a said first frequency detector, a said second detector and switching means which switch the receiver either to the lock-on mode or to the permanent mode by a control signal produced by a mode decision circuit.

5. The transmission system as claimed in claim 4, wherein the mode decision circuit determines a difference value R between said correction signal and a delayed version of the preceding correction signal, a comparing circuit comparing said difference value R with a predetermined threshold having a value Th, said control signal enabling the lock-on mode if $R > Th$ and enabling the permanent mode if $R \leq Th$.

6. A receiver for receiving signals transmitted according to an orthogonal N-frequency-division multiplexing technique using a first number N of carriers distributed symmetrically around a centre frequency $f_e$, which signals have a spectrum comprised of a central part formed by a second number N' of transmitted carriers where N' is smaller than N and a right-hand side part and a left-hand side part formed each by a third number of non-transmitted carriers, where said third number equals (N−N')/2, a frequency synchronizer which determines a synchronization correction signal, and a local oscillator controlled by said correction signal, wherein the frequency synchronizer determines the correction signal by measuring a difference of the power received in a pair of non-transmitted carriers, said pair being formed by a non-transmitted right-hand side carrier and a non-transmitted left-hand side carrier symmetrical with said non-transmitted right-hand carrier with respect to the centre frequency $f_e$.

7. A receiver as claimed in claim 6, wherein, for operating in the lock-on mode, the receiver comprises a first frequency detector which operates with various pairs of non-transmitted side carriers.

8. A receiver as claimed in claim 6, wherein, for operating in the permanent mode, the receiver comprises a second frequency detector which operates with a pair of non-transmitted side carriers which are nearest to the centre frequency $f_e$.

9. A receiver as claimed in claim 6, wherein it comprises a said first frequency detector, a said second frequency detector and switching means which switch the receiver either to the lock-on mode or to the permanent mode by a control signal produced by the mode decision circuit.

10. A receiver as claimed in claim 9, wherein the mode decision circuit determines a difference value R between said correction signal and a delayed version of the preceding correction signal, a comparing circuit comparing said difference value R with a predetermined threshold having a value Th, said control signal enabling the lock-on mode if $R > Th$ and enabling the permanent mode if $R \leq Th$.

11. The transmission system as claimed in claim 3, wherein it comprises said first frequency detector, a said second frequency detector and switching means which switch the receiver either to the lock-on mode or to a permanent mode by a control signal produced by the mode decision circuit.

12. The transmission system as claimed in claim 11, wherein the mode decision circuit determines a difference value R between said correction signal and a delayed version of the preceding correction signal, a comparing circuit comparing said difference value R with a predetermined correction signal, a comparing circuit comparing said difference value R with a predetermined threshold having a value Th, said control signal enabling the lock-in mode if $R > Th$ and enabling the permanent mode if $R \leq Th$.

13. A receiver as claimed in claim 8, wherein it comprises a said first frequency detector, a said second frequency detector and switching means which switch the receiver either to the lock-on mode or to the permanent mode by a control signal produced by the mode decision circuit.

14. A receiver as claimed in claim 13, wherein the mode decision circuit determines a difference value R between said correction signal and a delayed version of the preceding correction signal, a comparing circuit comparing said difference value R with a predetermined threshold having a value Th, said control signal enabling the lock-on mode if $R > Th$ and enabling the permanent mode if $R \leq Th$.

* * * * *